United States Patent
Yamamoto et al.

(10) Patent No.: US 7,168,040 B2
(45) Date of Patent: Jan. 23, 2007

(54) DOCUMENT PROCESSING APPARATUS AND METHOD FOR ANALYSIS AND FORMATION OF TAGGED HYPERTEXT DOCUMENTS

(75) Inventors: Yuki Yamamoto, Nei-gun (JP); Makoto Shiotsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/902,006

(22) Filed: Jul. 30, 2004

(65) Prior Publication Data

US 2005/0015720 A1    Jan. 20, 2005

Related U.S. Application Data

(62) Division of application No. 09/748,177, filed on Dec. 27, 2000, now abandoned.

(30) Foreign Application Priority Data

Mar. 31, 2000  (JP)  ............................... 2000-98427

(51) Int. Cl.
G06F 17/00 (2006.01)
(52) U.S. Cl. ...................... 715/536; 715/513
(58) Field of Classification Search ................ 715/536, 715/511, 703, 513; 707/203
See application file for complete search history.

(56) References Cited

U.S. PATENT DOCUMENTS

| | | | | |
|---|---|---|---|---|
| 4,456,969 A | | 6/1984 | Herzik et al. | |
| 5,351,189 A | * | 9/1994 | Doi et al. | 704/3 |
| 6,012,073 A | * | 1/2000 | Arend et al. | 715/526 |
| 6,047,251 A | * | 4/2000 | Pon et al. | 704/1 |
| 6,047,252 A | | 4/2000 | Kumano et al. | |
| 6,134,552 A | * | 10/2000 | Fritz et al. | 707/10 |
| 6,208,956 B1 | * | 3/2001 | Motoyama | 704/2 |
| 6,330,529 B1 | * | 12/2001 | Ito | 704/3 |
| 6,347,316 B1 | * | 2/2002 | Redpath | 707/10 |
| 6,496,844 B1 | * | 12/2002 | Hetherington et al. | 715/536 |
| 6,523,000 B1 | * | 2/2003 | Ando et al. | 704/2 |
| 2002/0177993 A1 | * | 11/2002 | Veditz et al. | 704/8 |
| 2003/0208405 A1 | * | 11/2003 | Pulman et al. | 705/16 |

FOREIGN PATENT DOCUMENTS

EP    0 810 533 A2    12/1997

(Continued)

OTHER PUBLICATIONS

Fortney, "Web Page Editing with Netscape Gold 3.0" Last Modified Aug. 5, 1997, http://www.phy.duke.edu/~fortney/notes/web_page_editing.htm.*

(Continued)

*Primary Examiner*—Adam M. Queler
(74) *Attorney, Agent, or Firm*—Staas & Halsey LLP

(57) ABSTRACT

A document processing apparatus has a language tag setting section for setting a language tag designating a kind of language at each of constituent unit positions in an original and those in a translated version corresponding to the original, and a document forming section for forming a tagged document including the original and the translated version each having the language tag set therein. This apparatus enables a user to easily form and maintain a home page (Web page data) expressed in a plurality of languages.

14 Claims, 12 Drawing Sheets

FOREIGN PATENT DOCUMENTS

| | | | |
|---|---|---|---|
| JP | 06103306 A | * | 4/1994 |
| JP | 10/74204 | | 3/1998 |
| JP | 10-078965 | | 3/1998 |
| JP | 10134059 A | | 5/1998 |
| JP | 10312383 A | | 11/1998 |
| JP | 11167578 A | | 6/1999 |

OTHER PUBLICATIONS

"Tool To Aid Translation of Web Pages Into Different National Languages" IBM Technical Disclosure Bulletin, vol. 41, No. 1, 1998, pp. 223-224, XP000772083 Armonk, NY, US ISSN: 0018-8689.

Gale et al.: "A Program for Aligning Stentences in Bilingual Corpora." Computational Linguistics, vol. 19, No. 1, Mar. 1, 1993, pp. 75-102, XP000431255, Cambridge, MA, US.

Database Inspec [Online.] The Institute of Electrical Engineers, Stevenage, GB; Inspec No. 5307955, Murata at al: "Realtime machine translation system for the world wide web" XP002043731 & Transactions of the Institiue of Electonics, Information and Communication Engineers B-1, vol. J79B-1, No. 5, May 1996, pp. 364-372.

Furmarr et al., "Positioning HTML Elements with Cascading Style Sheets, W3C Working Draft Jan. 31, 1997" (http://www.w3.org/TR/WR-positioning-970131).

U.S. Appl. No. 09/748,177, filed Dec. 27, 2000, Yuki Yamamoto et al.

U.S. Appl. No. 10/902,010, filed Jul.30, 2004, Yuki Yamamoto et al.

Office action issued by the United States Patent Office dated Jan. 5, 2005, for corresponding U.S. Appl. No. 09/748,177.

Peter, Stephen, "Comments", on a web page "last updated Jul. 21, 1996," www.fbe.unsw.edu.au/learning/html/page-des/comments.htm.

Notice of Reasons for Rejection dated Oct. 3, 2006 of Application No. JP 2001-062272.

* cited by examiner

FIG.6

```
<!DOCTYPE HTML PUBLIC "-//W3C//DTD HTML 4.0 TRANSITIONAL //EN">
<HTML>
<HEAD>

•

</HEAD>
<BODY BGCOLOR="#FFFFF">
&NBSP:

•

<E> ENGLISH HOMEPAGE SEARCH <BR>
<J> 英文ホームページ検索ソフト <BR>
   •
<E> SEARCH IN JAPANESE V1.0&NBSP: <BR>
<J> 日本語でサーチV11.0&NBSP <BR>
 、 •

<E> [THE LATEST UPDATE:99/09/23] <BR>
<J> [最新更新日:99/09/23] <BR>
   •

<E> "SEARCH IN JAPANESE" IS THE INTERNET TOOL WHICH CAN EASILY
    RETRIEVE AN OVERSEAS HOMEPAGE BY INPUTTING A JAPANESE KEY WORD
    ON THE WORLD WIDE WEB BROWSER
    &NBSP: <BR>
<J> 「日本語でサーチ」は、WWWブラウザ上で、日本語のキーワードを入力する
    ことにより海外のホームページを簡単に検索できるインターネットツールです。
    &NBSP: <BR>
   •

</BODY>
</HTML>
```

FIG.10

| NO | ORIGINAL | TRANSLATED VERSION |
|---|---|---|
| 1 | ENGLISH HOMEPAGE SEARCH | 英文ホームページ検索ソフト |
| 2 | SEARCH IN JAPANESE V1.0 | 日本語でサーチV1.0 |
| 3 | [THE LATEST UPDATE:99/09/23] | [最新更新日:99/09/23] |
| 4 | (EXCLUDING TAX) | (税別) |
| 5 | "SEARCH IN JAPANESE" IS THE INTERNET TOOL WHICH CAN EASILY RETRIEVEAN OVERSEAS HOMEPAGE BY INPUTTING A JAPANESE KEY WORD ON THE WORLD WIDE WEB BROWSER. | 「日本語でサーチ」は、WWWブラウザ上で、日本語のキーワードを入力することにより海外のホームページを簡単に検索できるインターネットツールです。 |
| 6 | "SEARCH IN JAPANESE" THE EXPERIENCE VERSION DOWN-LOADING. | 「日本語でサーチ」体験版ダウンロード |
| 7 | INTRODUCTION OF "SEARCH IN JAPANESE" | 「日本語でサーチ」のご紹介 |
| 8 | FAQ(QUESTIONS & ANSWERS | FAQ(QUESTIONS & ANSWERS) |
| 9 | "ENGLISH WEB RETRIEVEIN JAPANESE" FUNCTION EQUAL WITH "SEARCH IN JAPANESE" CAN BE USED. AND THERE IS "ATLAS FOR THE INTERNET+(PLUS) V5.0", TOO. | 「日本語でサーチ」と同等の「日本語で英文で英文WEB検索」機能が使える、「翻訳サーフィン＋(プラス)V5.0」もあります。 |
| 10 | TRANSLATION SOFTWARE RELATED TO ATLAS SERIES | ATLAS SERIES翻訳関連ソフト |
| 11 | OPINION AND QUESTION | ご意見・ご質問 |

DOCUMENT PROCESSING APPARATUS AND METHOD FOR ANALYSIS AND FORMATION OF TAGGED HYPERTEXT DOCUMENTS

This application is a divisional of application No. 09/748,177, filed Dec. 27, 2000, now abandoned.

BACKGROUND OF THE INVENTION

The present invention relates to a document processing apparatus and method which analyzes a tagged document, e.g., a Hyper Text Markup Language (HTML) document and forms another tagged document containing original sentences and translated sentences. The present invention also relates to a recording medium for recording such a tagged document.

With the recent proliferation of personal computers and communication apparatus, people have become able to use communication networks represented by the Internet, i.e., Internet protocol (IP) communication networks, and to easily obtain various sorts of information through the networks. Ordinarily, the World Wide Web in the Internet generally uses HTML as a language for describing information. Dynamic HTML (DHTML) and Extensible Markup Language (XML) are other languages presently used to form tagged documents.

Conventionally, to form home pages (also called Web pages) containing the same information described in different languages, e.g., English and Japanese, the process of separately forming each home page is required. That is, the steps of forming sentences separately in each language, pasting common images including graphs and figures, separately setting links from each of the English home page and the Japanese home page, etc., are required.

Home pages are open to the public on the Internet and can be read by people everywhere in the world. Therefore, people who set up their home pages for various readers to read are making home pages having the same format and contents but having sentences written in different languages. The English and Japanese home pages formed as described above need scrupulous attention for maintenance because their English and Japanese sentences after correction must be equivalent in meaning and format.

To form such English and Japanese home pages, it is necessary to make and manage two kinds of HTML document files for the English home page and the Japanese home page. That is, the number of files to be managed is increased in proportion to the number of languages, and management and maintenance becomes difficult.

A user who wishes to read document information in an English home page in Japanese may translate the English document information by using Internet translation software. However, if the user wishes to edit the results of the translation displayed as an HTML document, he or she must give up the idea of doing so or is further required to translate the translation results by different translation software, because direct editing of the translated HTML document is impossible.

If the user dares to edit the translation-result HTML document, he or she must perform the steps of storing the translation-result HTML document on a local disk, opening the HTML document file stored on the local disk by using HTML document editing software, displaying the HTML document source, directly editing the HTML document source, and storing the results of the editing on the local disk. This process enables editing of the translation results to some effect. However, it is difficult to edit a document in which HTML tags, original sentences, and translated sentences are mixed.

Further, in a case where an HTML document intended as an object of translation is prepared in advance and, from this document, another HTML document described in a different language is formed by translation processing using Internet translation software, a need may arise to edit the HTML document in the second language formed by the translation processing and, if necessary, the translation-object HTML document, if the author of the HTML document is not satisfied with the results of the translation.

In this editing, it is difficult to determine document portions to be edited and to confirm the correspondence between original and translated sentences, since the translation-object HTML document and the translation-result HTML document exist in separate files. It is also possible that, through editing, the page configuration (format) of one document will become different from that of the other.

As described above, the conventional HTML document processing apparatus can be designed to enable translation of an original home page on the Internet using Internet translation software and visual display of original and translated sentences in a juxtaposed form. However, in editing translation results, an HTML document itself cannot be edited. There is a way to directly edit the HTML document source, but editing in such a way is extremely troublesome and not satisfactorily effective.

SUMMARY OF THE INVENTION

In view of the above-described circumstances, an object of the present invention is to provide a document processing apparatus and a recording medium which make it possible to easily form and maintain a home page (Web page data) expressed in two or more languages.

Another object of the present invention is to provide a document processing apparatus and a recording medium which make it possible to easily edit translated sentences obtained as a result of translation of a tagged document.

Still another object of the present invention is to provide a document processing apparatus and a recording medium which make it possible to selectively display original sentences in a tagged document and translated sentences obtained as a result of translation of the tagged document.

A further object of the present invention is to provide a document processing apparatus and a recording medium which make it possible to return the edited translation sentences of the result of translation into a tagged document and to use it.

A further object of the present invention is to provide a document processing apparatus and a recording medium which make it possible to easily edit original sentences in a tagged document to from a more favorable translation.

To achieve the above-described objects, according to one aspect of the present invention, there is provided a document processing apparatus comprising a language tag setting unit for setting a language tag designating a kind of language at each of constituent unit positions in an original and those in a translated version corresponding to the original, and a document forming unit for forming a tagged document including the original and the translated version each having the language tag set therein.

The above-described document forming unit may form a tagged document in which the original and the translated version each having the language tag set therein are described in an original-versus-version form.

The above-described document processing apparatus further comprises a translation unit for translating the original to make the corresponding translated version.

The original may be contained in the processing-object tagged document.

The above-described document processing apparatus further comprises a visibility control tag setting unit for setting a visibility control tag for controlling any document portion so that the document portion is invisible, the visibility control tag setting unit setting the visibility control tag at such a position that one of the original and the translated version is in an invisible state.

The visibility control tag setting unit may set the visibility control tag at such a position that one of the original and the translated version is set in an invisible state and the language tag is also set in an invisible state.

The above-described document processing apparatus further comprises a display processing unit for interpreting the tag contained in the tagged document and for enabling a browser for displaying the tagged document to display the formed tagged document on the basis of a result of the interpretation in the above document processing apparatus.

According to another aspect of the present invention, there is provided a document processing apparatus comprising a language tag setting unit for setting a language tag at each of constituent unit positions in a first text described in a first language and those in a second text described in a second language of the first text, and a document forming unit for forming a tagged document including the first text and the second text each having the language tag set therein.

The above-described document forming unit may form a tagged document in which the first text and the corresponding second text each having the language tag set therein are described by being related to each other.

The above-described document processing apparatus further comprises a visibility control tag setting unit for setting a visibility control tag for controlling a text so that the text is invisible, the visibility control tag setting unit setting the visibility control tag at such a position that one of the first text and the second text is in an invisible state.

The visibility tag setting unit may set the visibility control tag at such a position that one of the first text and the second text is set in an invisible state and the language tag is also set in an invisible state.

The above-described document processing apparatus further comprises a display processing unit for interpreting the tag contained in the tagged document and for enabling a browser for displaying the tagged document to display the formed tagged document on the basis of a result of the interpretation.

According to still another aspect of the present invention, there is provided a document processing apparatus comprising an analysis unit for determining and extracting an original text from a processing-object tagged document, and an editing unit for enabling edit processing of the original text extracted from the tagged document by displaying the original text.

The analysis unit may determine the original text according to a language tag contained in the processing-object tagged document.

The above-described document processing apparatus further comprises a translation processing unit for making a translated version by translating the original text edited by the editing unit.

The above-described document processing apparatus further comprises a restoration unit for restoring, from the original text after the editing and the translated version made by the translation processing unit, a tagged document in the same format as the processing-object tagged document according to tags contained in the processing-object tagged document, the tags including the language tag.

According to yet another aspect of the present invention, there is provided a document processing apparatus comprising an analysis unit for determining an original text and a translated version corresponding to the original text in a processing-object tagged document, and an editing unit for enabling edit processing of the original text and the translated version by extracting the original text and the translated version from the tagged document and by displaying the original text and the translated version in an original-versus-version form.

The analysis unit may determine the original text and the translated version according to language tags contained in the processing-object tagged document.

The above-described document processing apparatus further comprises a translation processing unit for making a translated version by translating the original text edited by the editing unit.

The above-described document processing apparatus further comprises a restoration unit for restoring, from the original text after the editing and the translated version made by the translation processing unit, a tagged document in the same format as the processing-object tagged document according to tags contained in the processing-object tagged document, the tags including the language tag.

According to a further aspect of the present invention, there is provided a recording medium readable by a computer, the recording medium having a program recorded thereon, the program for enabling the computer to execute a step of setting a language tag designating a kind of language at each of constituent unit positions in an original and those in a translated version corresponding to the original, and a step of forming a tagged document including the original and the translated version each having the language tag set therein.

The program recorded on this recording medium may enable the computer to further execute a step of setting a visibility control tag for controlling any document portion so that the document portion is invisible, the visibility control tag being set at such a position that one of the original and the translated version is in an invisible state.

According to still a further aspect of the present invention, there is provided a recording medium readable by a computer, the recording medium having a program recorded thereon, the program for enabling the computer to execute a step of setting a language tag designating a kind of language at each of constituent unit positions in a first text described in a first language and those in a second text described in a second language of the first text, and a step of forming a tagged document including the first text and the second text each having the language tag set therein.

The program recorded on this recording medium may enable the computer to further execute a step of setting a visibility control tag for controlling a text so that the document is invisible, the visibility control tag being set at such a position that one of the first text and the second text is in an invisible state.

According to still a further aspect of the present invention, there is provided a recording medium readable by a computer, the recording medium having a program recorded thereon, the program for enabling the computer to execute a step of determining and extracting an original text from a processing-object tagged document, and a step of enabling editing of the text extracted from the tagged document by displaying the original text.

The program recorded on this recording medium may enable the computer to further execute a step of making a translated version by translating the original text after editing of the original text, and a step of restoring, from the original text after the editing and the translated version made by the translation, a tagged document in the same format as the processing-object tagged document according to tags contained in the processing-object tagged document, the tags including a language tag designating a kind of language.

According to still a further aspect of the present invention, there is provided a recording medium readable by a computer, the recording medium having a program recorded thereon, the program for enabling the computer to execute a step of determining an original text and a translated version corresponding to the original text in a processing-object tagged document, and a step of enabling editing of the original text and the translated version by extracting the original text and the translated version from the tagged document and by displaying the original text and the translated version in an original-versus-version form.

The program recorded on this recording medium may enable the computer to further execute a step of forming a translated version by translating the original text after editing of the original text, and a step of restoring, from the original text after the editing and the translated version made by the translation, a tagged document in the same format as the processing-object tagged document according to tags contained in the processing-object tagged document, the tags including a language tag designating a kind of language.

According to still a further aspect of the present invention, there is provided a recording medium readable by a computer, the recording medium having a tagged document recorded thereon, the recorded tagged document comprising a first language tag designating a first kind of language; a first text following the first language tag, the first text being described in a first language; a second language tag following the first text, the second language tag designating a second kind of language; and a second text following the second language tag, the second text being described in a second language and corresponding to the first text.

According to still a further aspect of the present invention, there is provided a recording medium readable by a computer, the recording medium having a tagged document recorded thereon, the recorded tagged document comprising an invisibility start tag for setting a following text in an invisible state; a first language tag following the invisibility start tag, the first language tag designating a first kind of language; a first text following the first language tag, the first text being described in a first language; a second language tag following the first text, the second language tag designating a second kind of language; an invisibility end tag following the second language tag, the invisibility end tag canceling the invisible state; and a second text following the invisibility end tag, the second text being described in a second language and corresponding to the first text.

According to a further aspect of the present invention, there is provided a document processing method comprising a step of setting a language tag designating a kind of language at each of constituent unit positions in an original and those in a translated version corresponding to the original; and a step of forming a tagged document including the original and the translated version each having the language tag set therein.

The above-described document processing method further comprises a step of setting a visibility control tag for controlling any document portion so that the document portion is invisible, said visibility control tag being set at such a position that one of the original and the translated version is in an invisible state.

According to still a further aspect of the present invention, there is provided a document processing method comprising a step of setting a language tag designating a kind of language at each of constituent unit positions in a first text described in a first language and those in a second text described in a second language of the first text; and a step of forming a tagged document including the first text and the second text each having the language tag set therein.

The above-described document processing method further comprises a step of setting a visibility control tag for controlling a text so that the document is invisible, said visibility control tag being set at such a position that one of the first text and the second text is in an invisible state.

According to still a further aspect of the present invention, there is provided a document processing method comprising a step of determining and extracting an original text from a processing-object tagged document; and a step of enabling editing of the original text extracted from the tagged document by displaying the original text.

The above-described document processing method further comprises a step of making a translated version by translating the original text after editing of the original text; and a step of restoring, from the original text after the edit processing and the translated version formed by said translation, a tagged document in the same format as the processing-object tagged document according to tags contained in the processing-object tagged document, said tags including a language tag designating a kind of language.

According to still a further aspect of the present invention, there is provided a document processing method comprising a step of determining an original text and a translated version corresponding to the original text in a processing-object tagged document; and a step of enabling edit processing of the original text and the translated version by extracting the original text and the translated version from the tagged document and by displaying the original text and the translated version in an original-versus-version form.

The above-described document processing method further comprises a step of forming a translated version by translating the original text after editing of the original text; and a step of restoring, from the original text after the edit processing and the translated version made by said translation, a tagged document in the same format as the processing-object tagged document, according to tags contained in the processing-object tagged document, said tags including a language tag designating a kind of language.

According to the present invention, it is not necessary to form and manage a file with respect to each of a plurality of languages, so that the maintenance can be easily carried out.

According to the present invention, an original text and a translated version of the original text obtained by translation are displayed in an original-versus-version form such that edit processing and version can be easily carried out.

According to the present invention, an original text in a tagged document and a translated version of the original text obtained by translation can be selectively displayed.

Further, according to the present invention, an edited translated version of the result of translation can be reformatted to the tagged document and used.

Further, according to the present invention, an original text in a tagged document can be easily edited to obtain a more favorable translated version.

BRIEF DESCRIPTION OF THE DRAWINGS

These objects and advantages of the present invention will become more apparent and more readily appreciated from the following detailed description of the presently preferred exemplary embodiments, taken in conjunction with the accompanying-drawings of which:

FIG. 6 is a diagram showing a specific example of an original-versus-version HTML document source;

FIG. 10 is a diagram showing an example of an initial window of an English-Japanese translation editor (original-versus-version editor program);

DESCRIPTION OF THE PREFERRED EMBODIMENTS

Embodiments of the present invention will be described with reference to the accompanying drawings.

[First Embodiment]

[Configuration of HTML Document Processing Apparatus]

Figure 1:
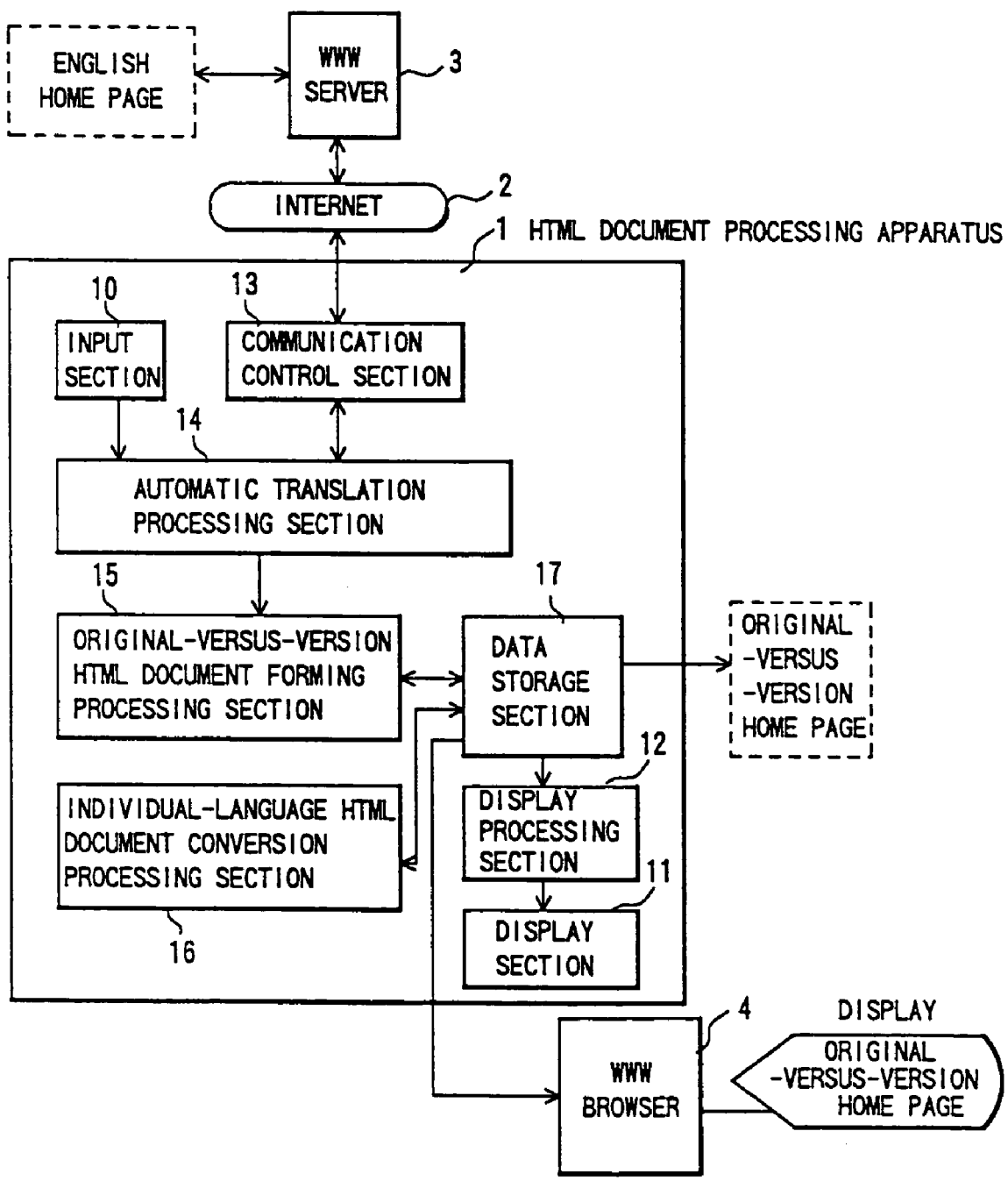
FIG. 1 is a block diagram showing the configuration of an HTML document processing apparatus which represents a first embodiment of the present invention.

FIG. 1 shows functional components of an HTML document processing apparatus 1 which represents a first embodiment of the present invention. As shown in FIG. 1, the HTML document processing apparatus 1 is connected to a World Wide Web (WWW) server 3 through an IP communication network, i.e., Internet 2. In this embodiment, the WWW server 3 holds English home pages (Web pages in which contents are described in English).

The HTML document processing apparatus 1 can be realized by a personal computer, and has an input section 10, a display section 11, a display processing section 12, a communication control section 13, an automatic translation processing section 14, an original-versus-version HTML document forming processing section 15, an individual-language HTML document conversion processing section 16, a data storage section 17, etc. The HTML document processing apparatus 1 is connected to a WWW browser 4 provided as an Internet display tool.

The personal computer has, as is well known, a central processing unit (CPU), a random access memory (RAM), a hard disk, a drive unit for accessing a portable recording medium, such as a floppy disk or a compact disk-read only memory (CD-ROM), to read out a program or data recorded thereon, a communication control unit, such as a modem or a local area network (LAN) board, a display, a keyboard, and a mouse.

The input section 10 of the HTML document processing apparatus 1 in this embodiment corresponds to the keyboard and the mouse; the display section 11 to the display; the data storage section 17 to the RAM, the hard disk or the portable recording medium; and the communication control section 13 to the communication control unit.

The display processing section 12, the automatic translation processing section 14, the original-versus-version HTML document forming processing section 15, and the individual-language HTML document conversion processing section 16 are realized by making the CPU execute a program of the present invention and a program of Internet translation software.

The program of the present invention and the Internet translation software are provided by being recorded on the portable recording medium, and are read out by the drive unit and stored in the hard disk in advance.

The above-described program and software stored in an external unit, may be downloaded to the HTML document processing apparatus 1 through the network using the communication control unit, and stored in the hard disk.

The program of the present invention and the Internet translation software stored in the hard disk are read to the RAM to be executed by the CPU. The programs of the present invention and the Internet translation software may be directly read to the RAM without being stored in the hard disk, instead of being temporality stored in the hard disk and thereafter read to the RAM as described above.

HTML documents formed by the HTML document processing apparatus 1 in this embodiment of the present invention are stored in the RAM, the hard disk or the portable recording medium.

In the HTML document processing apparatus 1 arranged as described above, the automatic translation processing section 14 translates an English HTML document (an original including sentences and figures) of an English home page described in English into a Japanese HTML document (a translated version) described in Japanese by using the home page translation functions of the Internet translation software, e.g., "ATLAS" (trademark of FUJITSU LIMITED) and the original and the results of the translation are visually displayed so that pairs of original and translated paragraphs or sentences are juxtaposed in upper and lower positions, as described below in detail.

In this translation and display process, the original-versus-version HTML document forming processing section 15 attaches a language tag, which is a special tag for identification of the kind of language, to the beginning of each of paragraphs or sentences which are constituent units of the original document and the translated document. The individual-language HTML document conversion processing section 16 recognizes the attached language tag to enable selective display of only one of the original and translated documents by further adding an invisibility tag (visibility control tag) to instruct to make no visual display.

[Operation of HTML Document Processing Apparatus]

Figure 2:
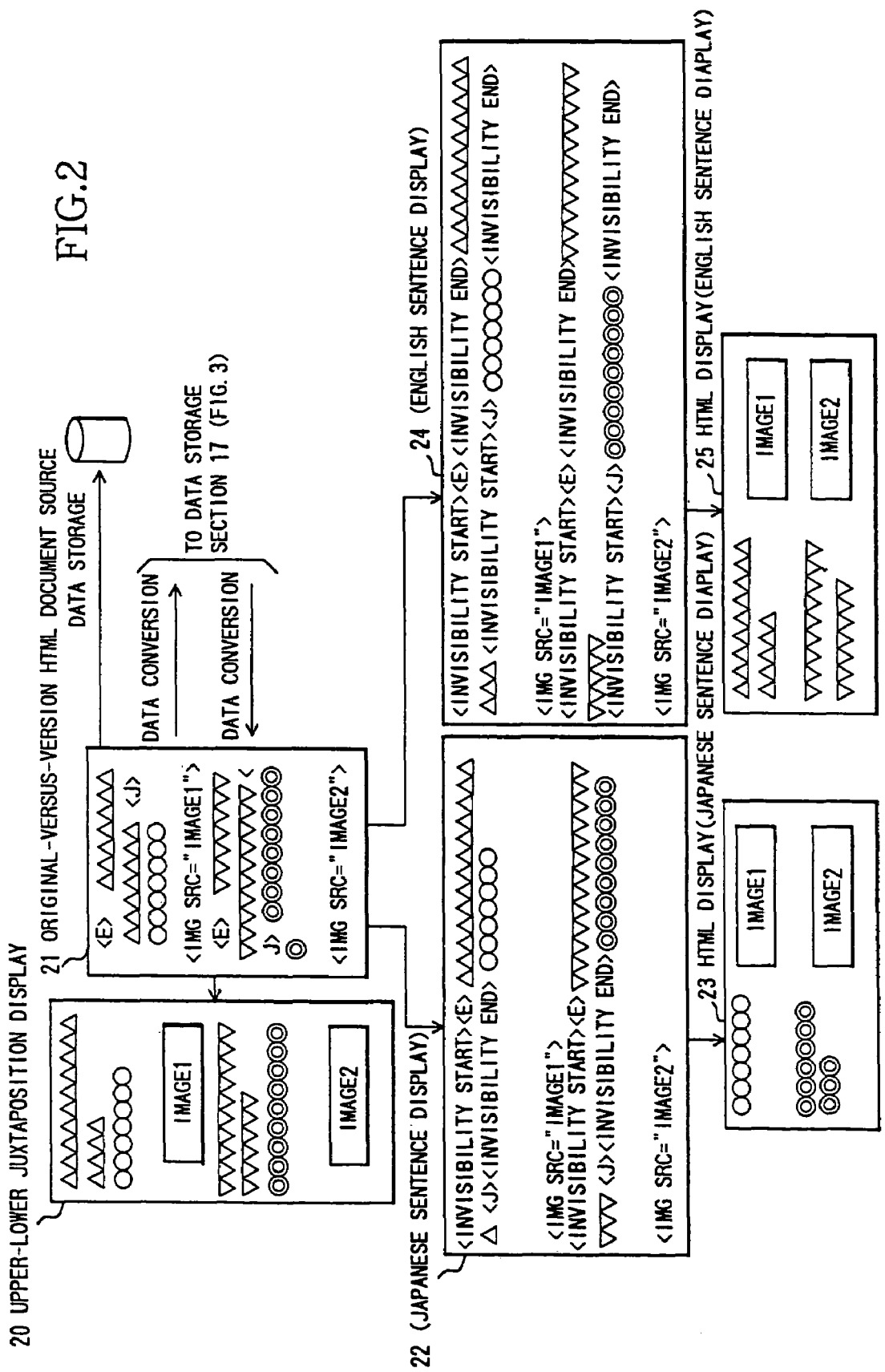
FIG. 2 is a diagram schematically showing the format and contents of an HTML document.
Figure 3:
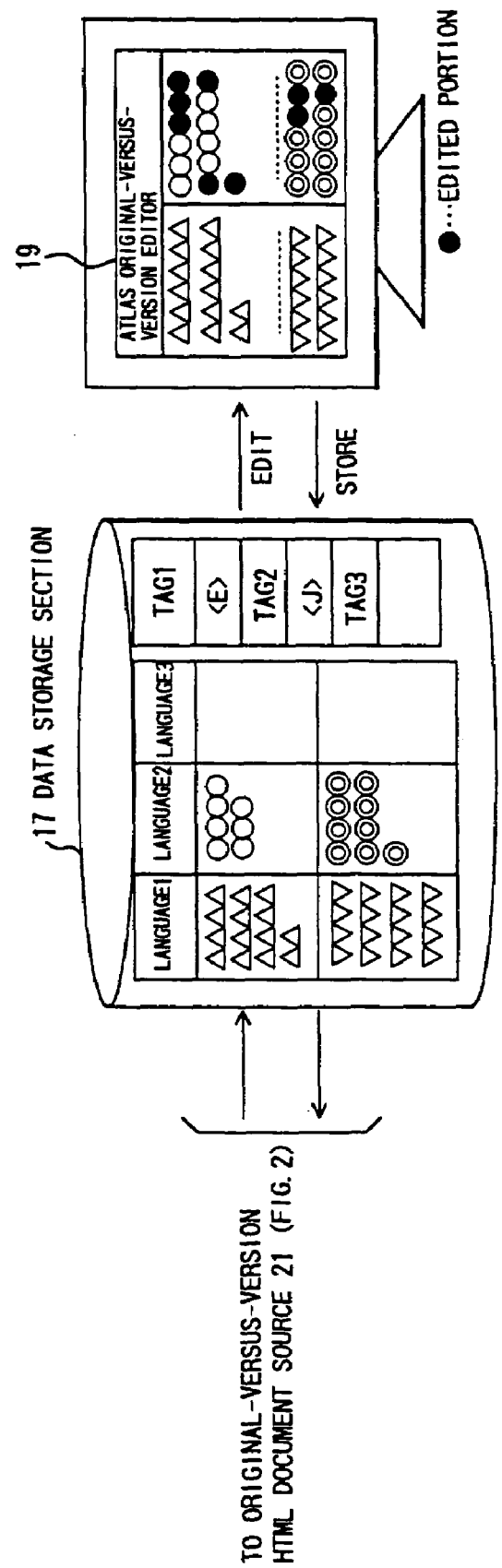
FIG. 3 is a diagram explaining a state where HTML documents are combined into one file and stored, and an edited state by a translation editor.
Figure 4:
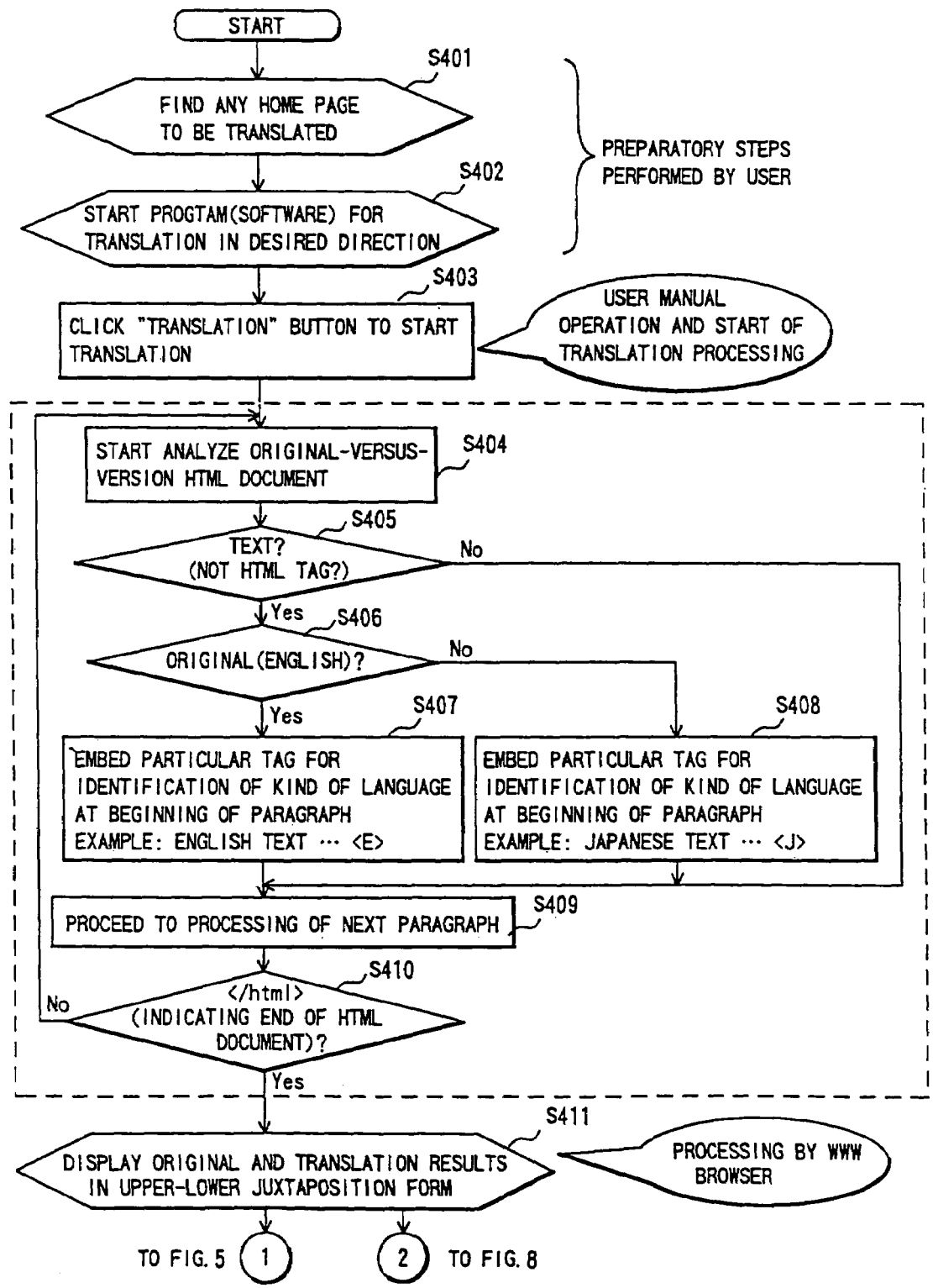
FIG. 4 is a flowchart for explaining the operation of the HTML document processing apparatus of the first embodiment.
Figure 5:
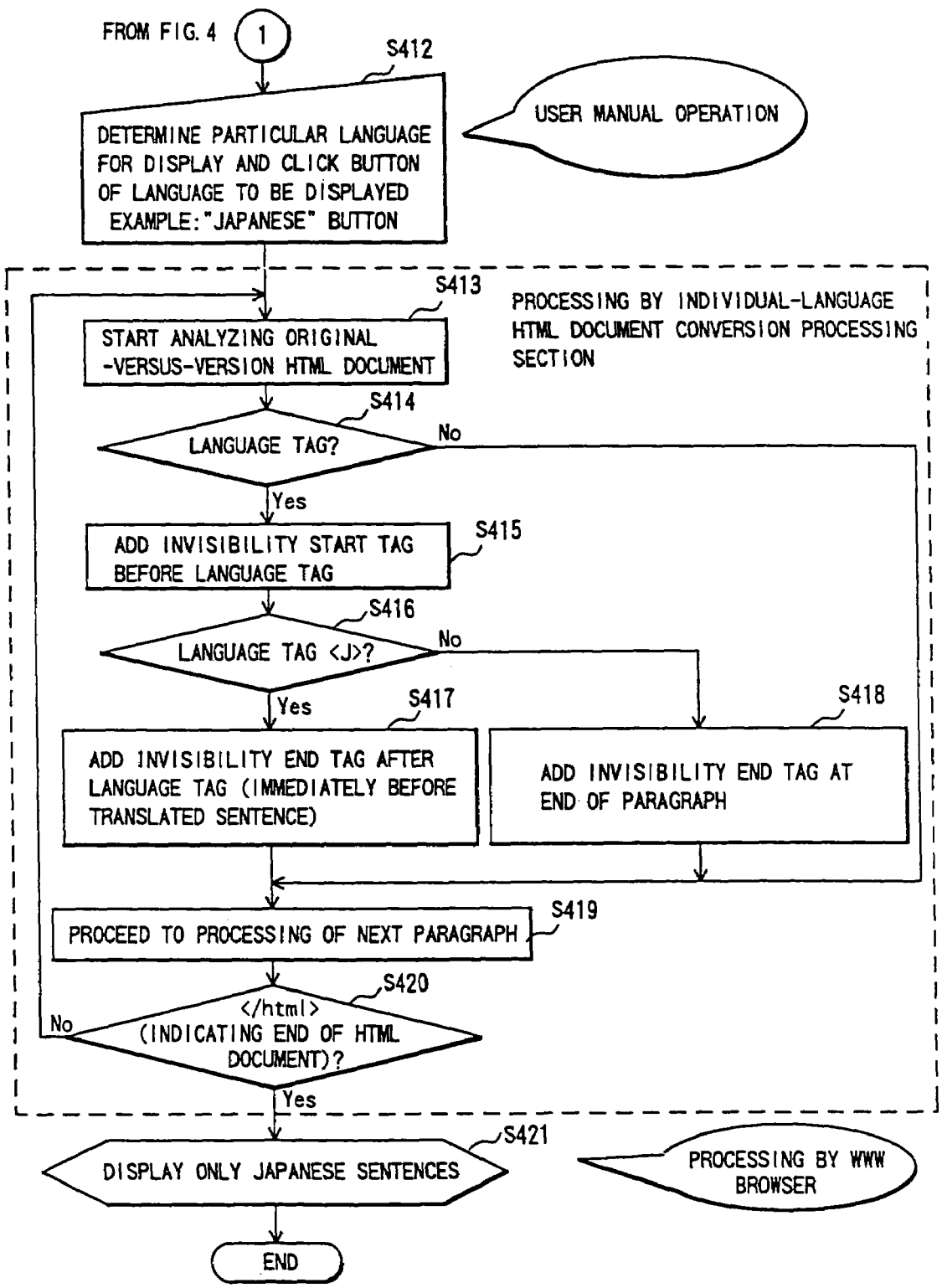
FIG. 5 is another flowchart for explaining the operation of the HTML document processing apparatus of the first embodiment.

The operation of the HTML document processing apparatus 1 in the first embodiment of the present invention shown in FIG. 1 will now be described. FIG. 2 schematically shows the compositions and contents of original and translated documents and a state where these documents are stored and displayed by being juxtaposed in the above-mentioned manner. FIG. 3 shows a state where an original HTML document and a version of the HTML document are stored and displayed while being combined into one file in such a form that each of pairs of original and translated sentences are juxtaposed in left and right positions. FIGS. 4 and 5 are flowcharts for explaining the operation of the HTML document processing apparatus 1.

(Original-Versus-Version HTML Document Forming Processing)

The operation will be described by way of example with respect to a case where, in the HTML document processing apparatus 1, an English HTML document (original) of an English home page described in English is translated into a Japanese HTML document (translated version) described in Japanese, and an original-versus-version HTML document is formed from the original and version and is visually displayed.

Referring also to FIGS. 1 through 5, a user using the HTML document processing apparatus 1 searches the Internet for a home page described in a language which he or she wishes to translate, by operating the input section 10 and based on the contents of a display made by the display section 11 (WWW browser). In this example, the object of this search (processing step S401 in FIG. 4) is an English home page held by the WWW server 3.

Next, the user initiates a program for translation in the desired direction by operating the input section 10 and based on the contents of the display made by the display section 11. In this example, the user wishes to translate an English HTML document of the English home page into a Japanese HTML document described in Japanese and therefore initiates an English-into-Japanese translation program (S402).

The user clicks a "translation" button displayed in an initial window (dialogue window) (not shown) of the translation program to make the HTML document processing apparatus 1 translate and arrange the English HTML document in such a manner that each of pairs of original and translated paragraphs or sentences can be displayed by being juxtaposed in upper and lower positions (S403). According to the user's "translation" button clicking operation, the automatic translation processing section 14 having the translation program read out from the hard disk, translates the English HTML document supplied from the WWW server 3 through the communication control section 13 into a Japanese document, and thereby forms an HTML document in which each of a certain number of English paragraphs or sentences are followed by a line break tag and a corresponding Japanese paragraph or sentence, that is, each of pairs of original and translated paragraphs or sentences are displayed by being juxtaposed in upper and lower positions. Known techniques can be used for the process of translation in the automatic translation processing section 14, and therefore such translation techniques will not be described in detail in this specification.

The original-versus-version HTML document forming processing section 15, supplied with the results of translation performed by the automatic translation section 14, i.e., the HTML document containing. Japanese sentences, starts analyzing the HTML document (S404) to add language tags for enabling discrimination between the original and translated paragraphs or sentences in the individual-language HTML document conversion processing section 16 described below in detail.

The original-versus-version HTML document forming processing section 15 first recognizes the part of a text of the inputted HTML document. The original-versus-version HTML document forming processing section 15 detects an HTML tag such as specifically shown in FIG. 6 (shown in the space between symbols < and > in FIG. 6) to recognize the section following this tag as English texts and Japanese texts (S405).

Next, the original-versus-version HTML document forming processing section 15 determines, if the texts recognized in step S405 are an English paragraph or sentence (original) or a Japanese paragraph or sentence (translated version) according to the position of the paragraphs or sentences (in the order of an English paragraph or sentence, a line break tag, and a Japanese paragraph or sentence) (step S406). If the original-versus-version HTML document forming processing section 15 recognizes an English paragraph or sentence as a result of this determination, it embeds a language tag <E> at the beginning of the document-component-unit paragraph or sentence (S407). If it recognizes a Japanese paragraph or sentence, it embeds a language tag <J> at the beginning of the document-component-unit paragraph or sentence (S408).

The original-versus-version HTML document forming processing section 15 proceeds to processing of the next paragraph in the original-versus-version HTML document, and makes a determination as to whether an HTML tag </html> indicating the end of the HTML document is detected or not (steps S409, S410). The original-versus-version HTML document forming processing section 15 repeats the above-described steps S404 to S410 until the HTML tag indicating the end of the HTML document is detected.

The original-versus-version HTML document forming processing section 15 stores in the data storage section 17 an original-versus-version HTML document obtained as a result of the original-versus-version HTML document forming processing based on the above-described sequence of document analysis steps, when the HTML tag indicating the end of the HTML document is detected. The state of data thereby stored is shown as an original-versus-version HTML document source 21 in FIG. 2. In FIG. 2, symbols Δ, and ∇ indicate English sentences and symbols ○, and ◉ indicate Japanese sentences.

After the original-versus-version HTML document forming processing performed by the original-versus-version HTML document forming processing section 15 based on the above-described sequence of document analysis steps, the display processing section 12 visually-displays the stored original-versus-version HTML document in the upper-lower juxtaposition form on the screen of the display section 11 (WWW browser 4) (step S411).

The original-versus-version HTML document source 21 is displayed in the upper-lower juxtaposition form, as indicated by reference numerals 20 in FIG. 2. In FIG. 2, "image1" and "image2" represent figures in the document.

(Processing for Selectively Displaying English HTML Document (Original) and Japanese HTML Document (Version))

In the HTML document processing apparatus, processing described below is performed after the original-versus-version HTML document forming processing based on the above-described sequence of document analysis steps. The processing described below enables selective display of only one of the English HTML document (original) and the Japanese HTML document (translated version) displayed in the upper-lower juxtaposition form on the screen of the display section 11.

The user determines display of the document in the particular language for selective display of the document, and clicks a button corresponding to the language to be displayed (a "Japanese" button in this example) (S412 in FIG. 5). In response to the user's "Japanese" button clicking operation, the HTML document processing apparatus 1 hands over processing to the individual-language HTML document conversion processing section 16 to enable selective display of only the English HTML document (original) or the Japanese HTML document (translated version). In the case where the objective languages are English and Japanese as in this example, "English" and "Japanese" buttons (not shown) are displayed.

The individual-language HTML document conversion processing section 16 reads out the original-versus-version HTML document source 21 to the data storage section 17 as shown in FIG. 2, and starts analyzing the document (S413). The individual-language HTML document conversion processing section 16 makes a determination as to whether or not a language tag <E> or <J> embedded in the original-versus-version HTML document source 21 has been detected (S414).

If the individual-language HTML document conversion processing section 16 has detected a language tag in the English original-vs.-Japanese version HTML document, it sets an invisibility start tag <INVISIBILITY START> as a visibility control tag immediately before the detected language tag (S415).

Thereafter, to enable visual display of only the Japanese sentences in the English original-vs.-Japanese version HTML document, the individual-language HTML document conversion processing section 16 makes a determination as to whether or not the language tag <J> is detected (S416). If the individual-language HTML document conversion processing section 16 has detected a language tag <J>, it sets an invisibility end tag <INVISIBILITY END> as a visibility control tag immediately after the detected tag (immediately before a translated sentence) (S417).

The well-known comment tag may be used as the above-mentioned visibility control tag. A sentence or paragraph bracketed by a pair of comment tags is not displayed by the WWW browser 4.

If the individual-language HTML document conversion processing section 16 recognizes the detected language tag as a language tag other than the language tag <J> in above step S416, it sets an invisibility end tag <INVISIBILITY END> at the end of the paragraph (S418). This process is effective in processing an original-versus-version HTML document containing sentences written in three or more languages. For example, if the original-versus-version HTML document contains German sentences (original) together with English sentences (original) and Japanese sentences (translated version), this process makes the German sentences invisible as well as the English sentences.

An original-versus-version HTML document 22 having invisibility tags <INVISIBILITY START>, <INVISIBILITY END> as visibility control tags added thereto as well as language tags <E> and <J>, as shown in FIG. 2, is formed in this manner to display Japanese sentences only. FIG. 2 shows this HTML document with source codes.

If no language tag is detected in above step S414, or after the completion of processing of the step S417 or 418, the individual-language HTML document conversion processing section 16 proceeds to processing of the next paragraph in the original-versus-version HTML document, and makes a determination as to whether or not an HTML tag </html> indicating the end of the HTML document has been detected (steps S419, S420). The individual-language HTML document conversion processing section 16 repeats the above-described steps S413 to S420 until the HTML tag indicating the end of the HTML document is detected.

The individual-language HTML document conversion processing section 16 stores in the data storage section 17 the HTML document with invisibility tags obtained as a result of the above-described sequence of process steps for selective display of the original-versus-version HTML document when the HTML tag indicating the end of the original-versus-version HTML document is detected.

The display processing section 12 then opens the HTML document with invisibility tags by the WWW browser 4, and visually displays the document on the screen of the display section 11 (S421). A Japanese sentence HTML display 23 shown in FIG. 2 represents the state of this display on the screen.

Further, FIG. 2 shows the source code for enabling display of English sentences only in an original-versus-version HTML document 24, and shows an HTML display 25 which represents the state of display on the screen when the HTML document 24 is displayed by the WWW browser 4.

[Second Embodiment]
[Configuration of HTML Document Processing Apparatus]

Figure 7:
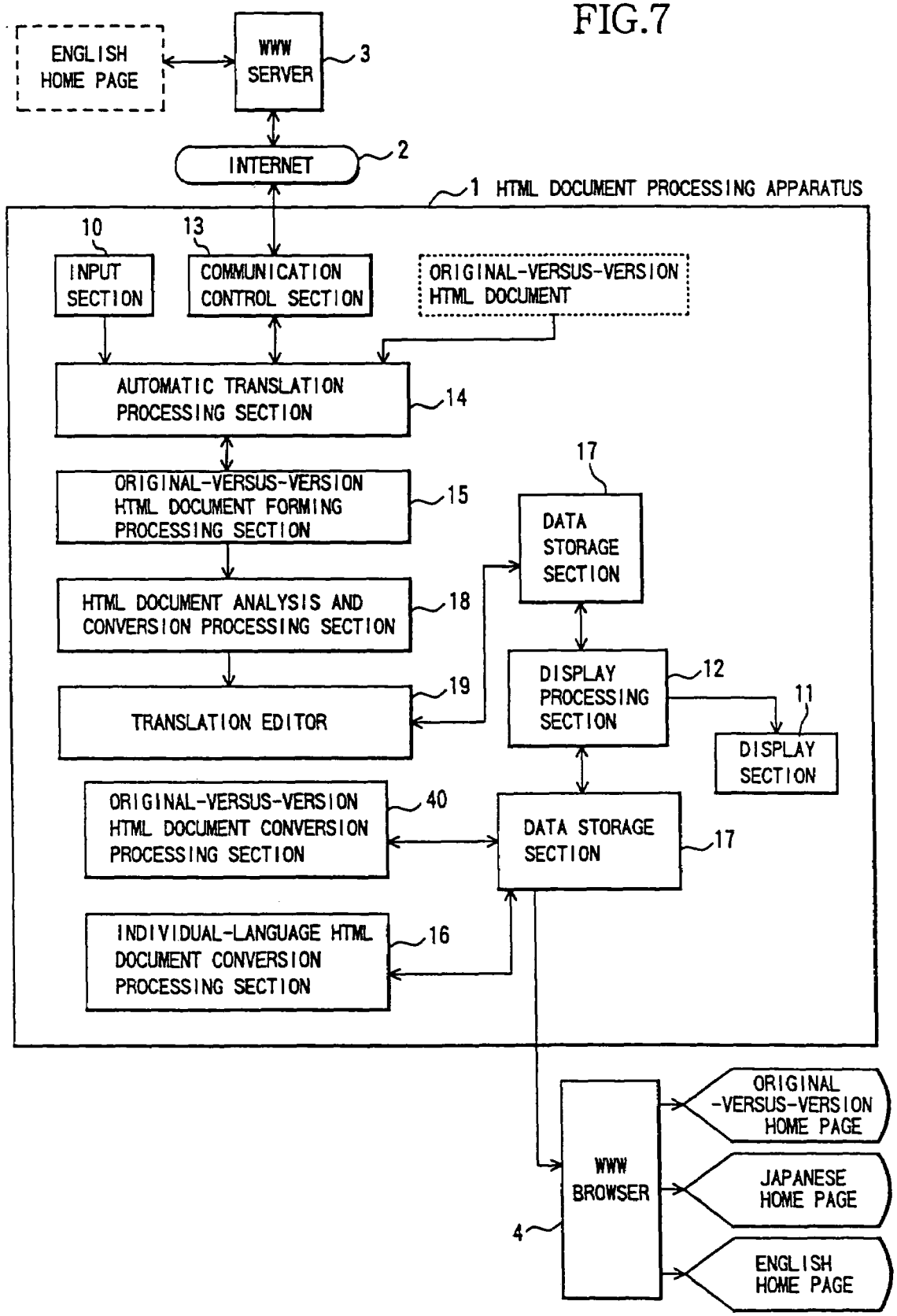
FIG. 7 is a block diagram showing the configuration of an HTML document processing apparatus which represents second and third embodiments of the present invention.

FIG. 7 shows functional components of an HTML document processing apparatus 1 which represents a Embodiment 2 of the present invention. The HTML document processing apparatus 1 is connected to a World Wide Web (WWW) server 3 through an IP communication network, i.e., Internet 2. In this embodiment, the WWW server 3 holds English home pages.

The HTML document processing apparatus 1 can be realized by a personal computer, and has an input section 10, a display section 11, a display processing section 12, a communication control section 13, an automatic translation processing section 14, an original-versus-version HTML document forming processing section 15, an individual-language HTML document conversion processing section 16, a data storage section 17, an HTML document analysis and conversion processing section 18, an English-Japanese translation editor (original-versus-version editor program) 19, an original-versus-version HTML document conversion processing section 40, etc. The HTML document processing apparatus 1 is connected to a WWW browser 4 provided as an Internet display tool.

In the HTML document processing apparatus arranged as described above, the automatic translation processing section 14 translates an English HTML document (an original including sentences and figures) of an English home page described in English into a Japanese HTML document (a translated version) described in Japanese, by using the home page translation functions of the above-mentioned Internet translation software, and the original and the results of the translation are visually displayed in such a form that each of pairs of original and translated paragraphs or sentences are juxtaposed in upper and lower positions.

In this translation and display process, the original-versus-version HTML document forming processing section 15 attaches a language tag, which is a special tag for determination of the kind of language, to the beginning of each of paragraphs or sentences which are constituent units of the original document and the translated document.

The HTML document analysis and conversion processing section 18 and the English-Japanese translation editor (original-versus-version editor program) 19 extract data with respect to each language, when data is edited in an original-versus-version form. After editing of original-versus-version data performed by the editor, HTML tags are restored to form an HTML document from the edited data.

If an HTML document is translated by Internet translation software, translation results outputted in an original-versus-version form cannot be edited. However, document data prepared by removing HTML tags from the translation results is supplied to the editor capable of editing data in an original-versus-version form to enable editing of the translation results. Also, HTML tags are restored in edit results to enable the edit results to be used-as an HTML document.

[Operation of HTML Document Processing Apparatus]

Figure 8:
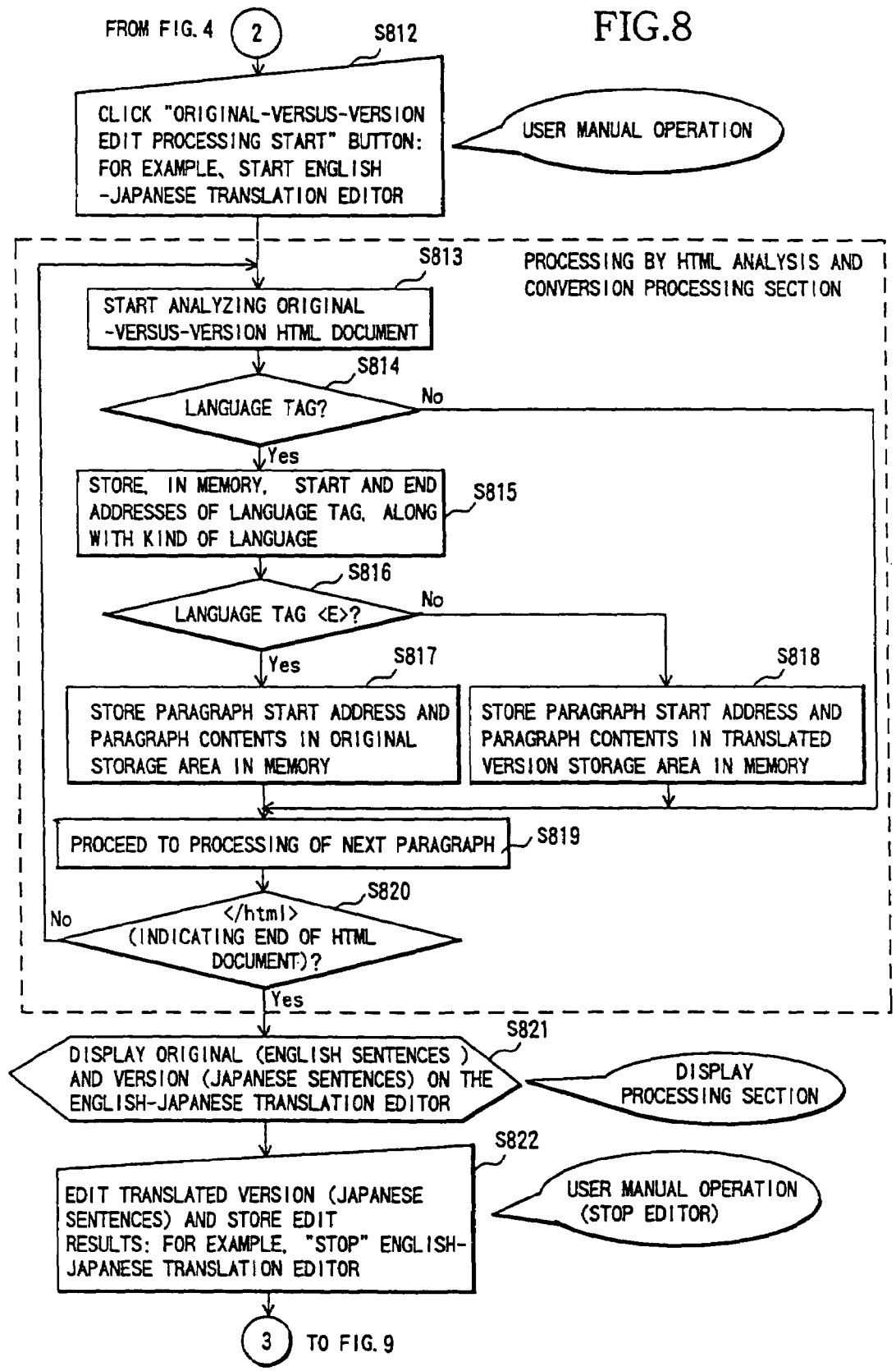
FIG. 8 is a flowchart for explaining the operation of the HTML document processing apparatus of the second embodiment.
Figure 9:
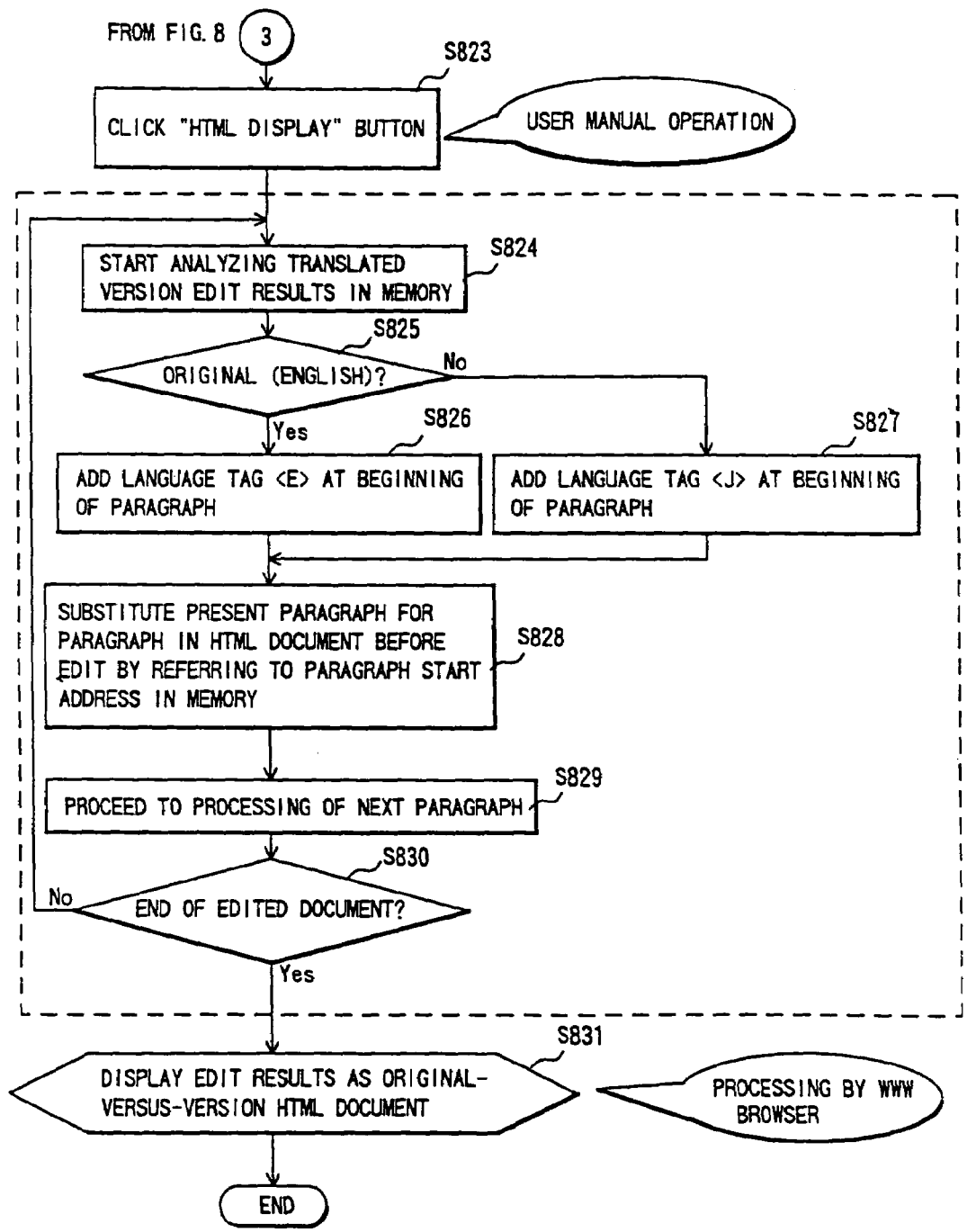
FIG. 9 is another flowchart for explaining the operation of the HTML document processing apparatus of the second embodiment.

The operation of the HTML document processing apparatus 1 in Embodiment 2 of the present invention shown in FIG. 7 will now be described. FIGS. 8 and 9 are flowcharts for explaining the operation of the HTML document processing apparatus 1.

(Original-Versus-Version HTML Document Forming Processing)

Referring to FIGS. 7 through 9, in the HTML document processing apparatus 1, an English HTML document (original) of an English home page described in English is translated, an HTML document including the formed original and translated version is analyzed, and an original-versus-version HTML document having language tags embedded therein is formed and visually displayed. This document forming and displaying processing is the same as that performed by the HTML document processing apparatus 1 Embodiment 1 described above, i.e., the process steps S401 to S414 shown in FIG. 4.

(Original-versus-version HTML Document Data Conversion Processing and Translated Version Edit Processing)

In the HTML document processing apparatus 1, after the above-described processing of forming an original-versus-version HTML document displayed in an upper-lower juxtaposition form on the screen of the display section 11, data conversion processing and translated version edit processing can be performed in a process described below.

When a user clicks an "original-versus-version edit processing start" button, the automatic translation processing section 14 having translation software hands over processing to the HTML document analysis and conversion processing section 18 (S812 in FIG. 8) to enable editing of the Japanese HTML document (version) in the original-versus-version HTML document 20 shown in FIG. 2.

The HTML document analysis and conversion processing section 18 starts processing for enabling editing using the English-Japanese translation editor (original-versus-version editor program) 19 by removing language tags from the original-versus-version HTML document source 21 having language tags <E> and <J> added thereto (S813).

First, the HTML document analysis and conversion processing section 18 makes a determination as to whether a language tag <E> or <J> embedded in the original-versus-version HTML document in the original-versus-version HTML document forming processing section 15 has been detected (S814).

If the HTML document analysis and conversion processing section 18 has detected a language tag <E> or <J> in the English original-versus-Japanese version HTML document, it stores in the data storage section 17 language data together with language tag start and end addresses (S815).

Thereafter, to enable display and edit of English sentences in the English original-vs.-Japanese version HTML document, the HTML document analysis and conversion processing section 18 makes a determination as to whether or not the detected language tag is a language tag <E> (S816). If the detected language tag is a language tag <E>, the HTML document analysis and conversion processing section 18 stores in an original document storage area in the data storage section 17, the start address of a document constituent unit paragraph (or sentence) and the contents of the paragraph (S817).

If the result of above determination in step S816 detects a language tag <J>, the HTML document analysis and conversion processing section 18 stores in a version storage area in the data storage section-17, the start address of a document constituent unit paragraph (or sentence) and the contents of the paragraph (S818) to enable Japanese sentence display and edit. As a result of the above process steps S815 to S818, English and Japanese paragraphs or sentences from which HTML tags have been removed and the start and end addresses of the paragraphs or sentences are stored in the data storage section 17.

If no language tag is detected in above step S814, or after the completion of processing in above step S817 or 818, the HTML document analysis and conversion processing section 18 proceeds to processing of the next paragraph in the original-versus-version HTML document 21, and makes a determination as to whether or not an HTML tag </html> indicating the end of the HTML document is detected (steps S819, S820).

The HTML document analysis and conversion processing section 18 repeats the above-described steps S813 to S820 in cooperation with the English-Japanese translation editor (original-versus-version editor program) 19, until the HTML tag indicating the end of the HTML document is detected. FIG. 10 shows an example of an initial window of the English-Japanese translation editor.

When the HTML tag indicating the end of the original-versus-version HTML document is detected, the HTML document analysis and conversion processing section 18 visually displays (S821), in the window of the English-Japanese translation editor (display section 11), the results of the above-described sequence of process steps for converting the original-versus-version HTML document data, i.e., English paragraphs or sentences (original) and Japanese paragraphs or sentences (translated version) from which the language tags and the HTML tags have been removed.

The user edits the Japanese sentences according to his or her need on the basis of the English and Japanese paragraphs or sentences visually displayed in the left-right juxtaposition form in the window of the English-Japanese translation editor. The symbol ● in the translated sentences shown in FIG. 3 designates edited portions. When the user clicks an "end" button in the English-Japanese translation editor window after suitably editing the Japanese version, the English-Japanese translation editor (original-versus-version editor program) 19 stores the results of editing in the data storage section 17, thereby completing the edit processing (S822).

(Processing for Restoration to HTML Document Format)

In the HTML document processing apparatus 1, after the above-described original-versus-version HTML document data conversion processing and translated version editing processing, a process described below is further performed to enable restoration to the HTML document format.

When the user clicks an "HTML display" button in the English-Japanese translation editor window, the English-Japanese translation editor (original-versus-version editor program) 19 is started (S823). By an instruction from the English-Japanese translation editor 19, the original-versus-version HTML document conversion processing section 40 starts analyzing the edited document (S824).

First, the original-versus-version HTML document conversion processing section 40 reads out one of the English paragraphs or sentences (original) or the Japanese paragraphs or sentences (translated version) stored in the data storage section 17, and makes a determination as to whether the document constituent unit, i.e., the paragraph or sentence, is English (original) or Japanese (translated version) (S825). This determination can be definitely made based on the language tags stored in the data storage section 17.

If the result of this determination is that the paragraph or sentence read out is English, the original-versus-version HTML document conversion processing section 40 adds the language tag <E> to the beginning of the paragraph (S826). If the paragraph read out is Japanese, the original-versus-version HTML document conversion processing section 40 adds the language tag <J> to the beginning of the paragraph (S827). The original-versus-version HTML document conversion processing section 40 substitutes (S828) the paragraph of the edited document for the corresponding paragraph of the original-versus-version HTML document before editing by referring to the paragraph start address stored in the data storage section 17.

The original-versus-version HTML document conversion processing section 40 then proceeds to processing of the next paragraph and makes a determination as to whether or not the end of the edited document has been reached (steps S829, S830). The original-versus-version HTML document conversion processing section 40 repeats the above-described steps S824 to S830 until the end of the edited document is reached.

The original-versus-version HTML document conversion processing section 40 stores in the data storage section 17 the original-versus-version HTML document obtained as a result of the above-described sequence of HTML document restoration processing steps. The display processing section 12 opens, by the WWW browser 4, the original-versus-version HTML document stored in the data storage section 17, thereby making a display reflecting the editing results (S831).

When the original-versus-version HTML document is displayed on the editor, the English paragraphs or sentences and the positions of the same, and the Japanese paragraphs or sentences and the positions of the same in the original-versus-version HTML document are stored in the respective storage areas in the data storage section 17, and the original-versus-version HTML document before editing is also held by the data storage section 17. From the information on the positions of the English and Japanese paragraphs or sentences stored in the storage areas, the other portions can be identified as the tags. In this manner, the positions of the tags can be obtained reciprocally from the positions of the English and Japanese paragraphs or sentences, and HTML document restoration processing can be performed by using the tags in the original-versus-version HTML document before editing with reference to the tag position information obtained from the paragraph or sentence positions.

The formed original-versus-version HTML document can be displayed in the form of an original-versus-version home page by the Internet display tool WWW browser 4 if it may formed without invisibility tags. Selective display processing (see FIG. 5) of the original-versus-version HTML document may be performed by the individual-language HTML document conversion processing section 16 if necessary, as in the HTML document processing apparatus 1 in above-described Embodiment 1, thereby enabling only the Japanese HTML document (version) obtained by this processing to be visually displayed by the display section 11.

[Embodiment 3]
[Configuration of HTML Document Processing Apparatus]

An HTML document processing apparatus 1 which represents Embodiment 3 of the present invention has basically the same functions and configuration as the HTML document processing apparatus 1 of Embodiment 2 shown in FIG. 7.

In the HTML document processing apparatus 1 in the third embodiment, however, there is no need for the automatic translation processing section 14 and the original-versus-version HTML document forming processing section 15.

In this HTML document processing apparatus 1, the HTML document analysis and conversion processing section 18 and the English-Japanese translation editor (original-versus-version editor program) 19 cooperate to perform data conversion by removing HTML tags from an English HTML document (original) of an English home page described in English, thereby enabling editing of the original and inputting of a translated version. A user edits the editable English sentences according to his or her need and inputs Japanese sentences (translated version).

Also, the original-versus-version HTML document conversion processing section 40 substitutes edited English and Japanese sentences for the original English sentences, restores the removed HTML tags, and sets translation-result Japanese sentences (translated version) in correspondence with the edited sentences, thereby enabling visual display of an original-versus-version HTML document containing a more favorable version.

[Operation of HTML Document Processing Apparatus]
(Data Conversion Processing and Original Edit Processing of English HTML Document (Original))

Figure 11:
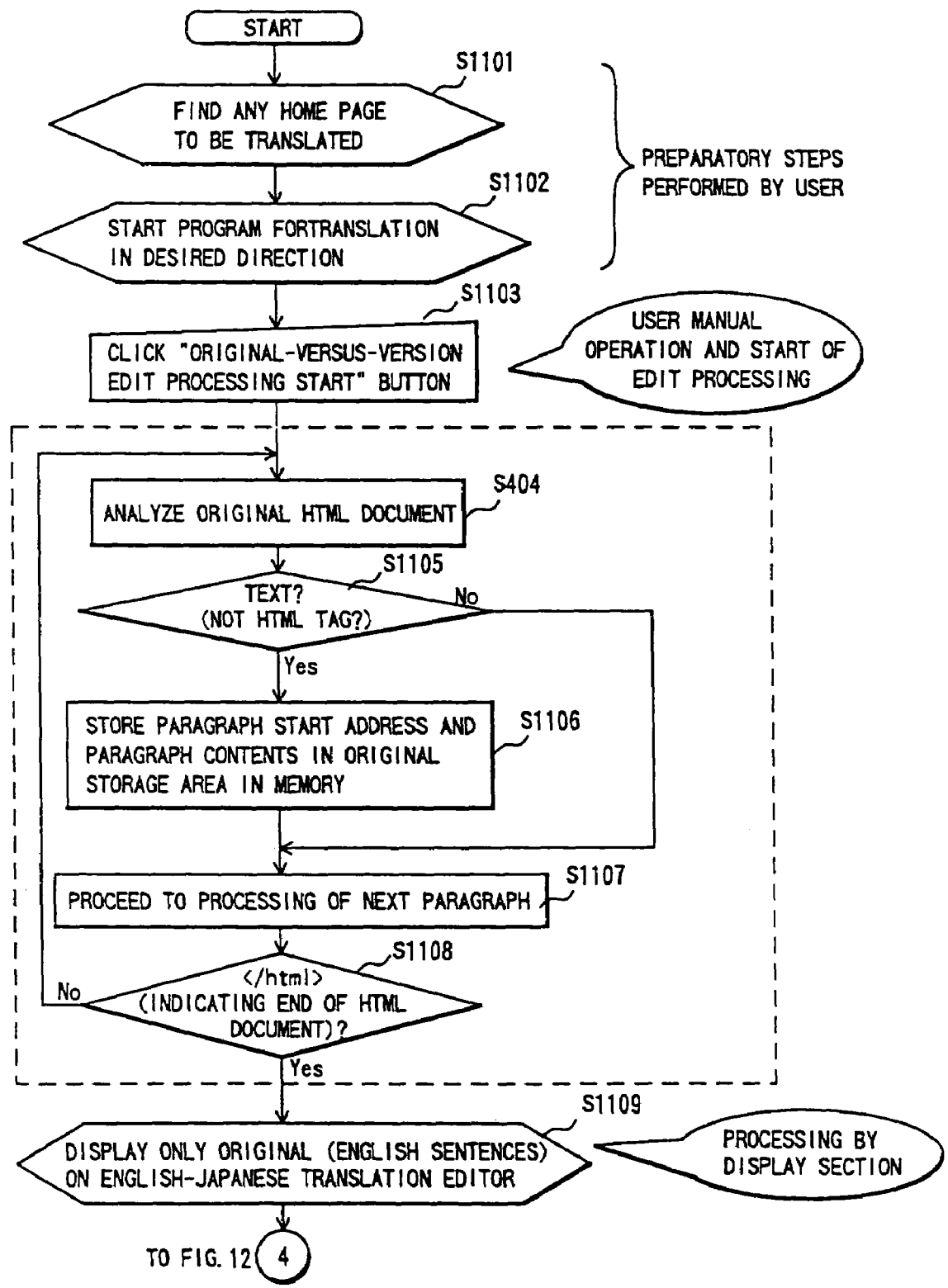
FIG. 11 is a flowchart for explaining the operation of the HTML document processing apparatus of the third embodiment.
Figure 12:
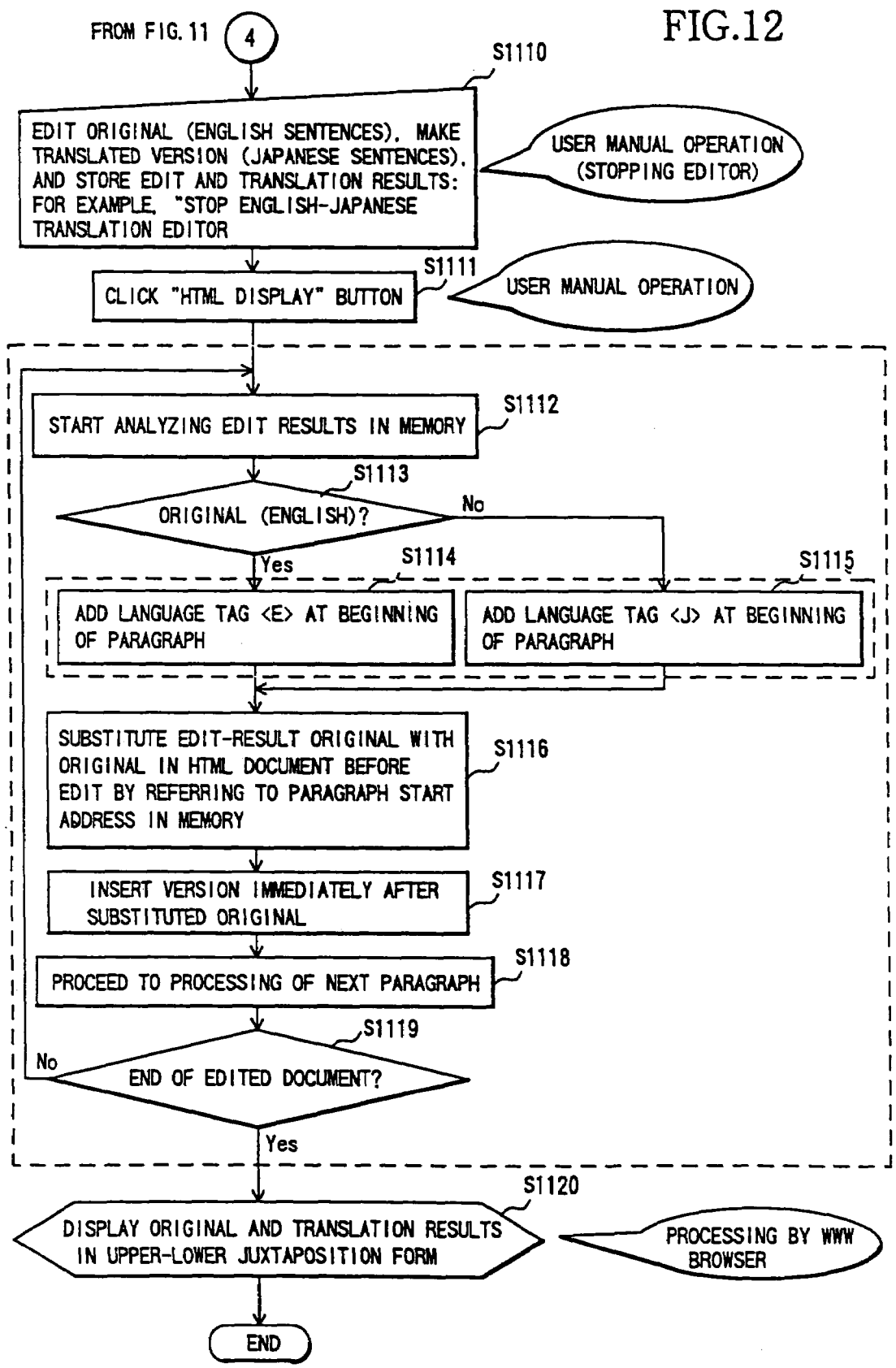
FIG. 12 is another flowchart for explaining the operation of the HTML document processing apparatus of the third embodiment.

FIG. 7 shows the configuration of this HTML document processing apparatus 1, and FIGS. 11 and 12 are flowcharts for explaining the operation of this HTML document processing apparatus 1. Referring to FIGS. 7, 11, and 12, a user using the HTML document processing apparatus 1 searches the Internet for a home page described in a language which he or she wishes to translate, by operating the input section 10 and based on the contents of a display made by the display section 11. In this example, the object of this search (processing step S1101 in FIG. 11) is an English home page held by the WWW server 3.

Next, the user initiates a program for translation in the desired direction by operating the input section 10 and based on the contents of the display made by the display section 11. In this example, the English home page is to be finally translated into a Japanese HTML document described in Japanese. Therefore, an English-into-Japanese translation program is started (S1102).

The user clicks an "original-versus-version edit processing start" button in an initial window (dialogue window) (not shown) of the translation program to start the English-Japanese translation editor (original-versus-version editor program) 19 (S1103).

The HTML document analysis and conversion processing section 18 starts analyzing (S1104) the English HTML document (original) supplied from the WWW server 3 through the communication control section 13. First, the HTML document analysis and conversion processing section 18 recognizes a text portion of the English HTML document The HTML document analysis and conversion processing section 18 detects an HTML tag to recognize the section following this tag as an English text (S1105).

Next, the HTML document analysis and conversion processing section 18 stores in the original storage area in the data storage section 17 the start address of a document constituent unit paragraph (or sentence) and the contents of the paragraph (S1106). As a result of the processing in the above steps S1105 and S1106, the English paragraph or sentence from which the HTML tag has been removed is stored in the data storage section 17.

If HTML tag is detected in above step S1105, or after the completion of processing in the step S1106, the HTML document analysis and conversion processing section 18 proceeds to processing of the next paragraph in the English HTML document, and makes a determination as to whether or not an HTML tag </html> indicating the end of the HTML document is detected (steps S1107, S1108).

The HTML document analysis and conversion processing section 18 repeats the above-described steps S1104 to S1108 in cooperation with the English-Japanese translation editor (original-versus-version editor program) 19 until the HTML tag indicating the end of the English HTML document is detected.

When the HTML tag indicating the end of the English HTML document is detected, the HTML document analysis and conversion processing section 18 visually displays (S1109) in a left-hand section of the window of the English-Japanese translation editor (display section 11), the results of the above-described sequence of process steps for converting the English HTML document data.

The user performs manual translation on the basis of the English paragraphs or sentences (original) visually displayed in the window of the English-Japanese translation editor, and forms translated sentences (Japanese sentences) by operating the input section 10. In this translation processing, the user edits the English sentences and, if necessary the Japanese translated sentences according to his or her need. When the user clicks an "end" button in the English-Japanese translation editor window after suitably editing the original and completing the Japanese version, the English-Japanese translation editor (original-versus-version editor program) 19 stores the results of editing and translation in the data storage section 17, thereby completing the processing (S1110).

(Processing for Restoration to HTML Document Format)

In the HTML document processing apparatus 1, after the above-described English HTML document (original) data conversion processing and original editing processing, a process described below is next performed to enable restoration processing of the HTML document format.

When the user clicks an "HTML display" button in the English-Japanese translation editor window, the English-Japanese translation editor (original-versus-version editor program) 19 is again started (S1111). By an instruction from the English-Japanese translation editor 19, the original-versus-version HTML document conversion processing section 40 starts analyzing the resulting edited document (S1112).

First, the original-versus-version HTML document conversion processing section 40 reads out one of the English paragraphs or sentences (original) stored in the data storage section 17, and makes a determination as to whether or not the document constituent unit, i.e., the paragraph (or sentence), is English (original) (S1113). This determination can be definitely made based on the storage positions stored in the left-right juxtaposition form in the data storage section 17.

If the result of this determination is that the paragraph or sentence read out is English, the original-versus-version HTML document conversion processing section 40 adds the language tag <E> to the beginning of the paragraph (S1114). If the paragraph read out is Japanese, the original-versus-version HTML document conversion processing section 40 adds the language tag <J> to the beginning of the paragraph (S1115).

The original-versus-version HTML document conversion processing section 40 substitutes (S1116) the paragraph of the resulting edited original with the language tag added thereto for the corresponding original paragraph of the HTML document before editing, by referring to the paragraph start address stored in the data storage section 17, and inserts the translated sentence formed in the above-described step S1110 immediately after the substituted original paragraph (S1117).

The original-versus-version HTML document conversion processing section 40 then proceeds to processing of the next paragraph and makes a determination as to whether or not the end of the edited document has been reached (steps S1118, S1119). The original-versus-version HTML document conversion processing section 40 repeats the above-described steps S1112 to S1119 until the end of the edited document is reached.

The original-versus-version HTML document conversion processing section 40 stores in the data storage section 17 the original-versus-version HTML document obtained as a result of the above-described sequence of HTML document restoration processing steps. The display processing section 12 then opens, by the WWW browser 4, the original-versus-version HTML document stored in the data storage section 17, thereby making a display reflecting the editing results (S1120).

Also in this embodiment, HTML document restoration processing can be performed by using the tags in the original-versus-version HTML document in the same manner as that in Embodiment 2.

Also, selective display processing (see FIG. 5) of the original-versus-version HTML document may be performed by the individual-language HTML document conversion processing section 16 if necessary, as in the HTML document processing apparatus 1 in the above-described Embodiment 1, thereby enabling only the Japanese HTML document (translated version) obtained by this processing to be visually displayed in the display section 11.

Examples of Modification

In the HTML document processing apparatus 1 in the above-described third embodiment, translated sentences are formed by manual translation. However, an automatic translation process using the automatic translation processing section 14 may also be performed in the third embodiment, similar to that in the HTML document processing apparatuses in the first and second embodiments. Conversely, manual translation may be performed in the HTML document processing apparatuses in the first and second embodiments.

In each of the HTML document processing apparatuses in the above-described embodiments, an original written in English, is translated into Japanese. However, the HTML document processing apparatus of the present invention can also operate in the same manner with respect to the respective languages, and can similarly process an HTML document having sentences written in three or more languages.

In the HTML document processing apparatus 1 in the first embodiment, invisibility tags designating inhibition of visual display are set as visibility control tags in an HTML document. However, it is also possible to print only a document expressed in a particular language selected by setting such tags.

Each of the above-described processes according to the present invention can be applied in association with a computer-readable medium.

Although only a few embodiments of the present invention have been described in detail above, those skilled in the art will readily appreciate that many modifications are possible in the preferred embodiments without departing from the novel teachings and advantages of the present invention. Accordingly, all such modifications are intended to be included within the scope of the present invention as defined by the following claims.

What is claimed is:

1. A computer implemented document processing apparatus, comprising:
    an analysis unit determining and extracting an original text from a tagged markup language source document resulting in the removal of at least first and second language tags designating at least first and second human languages, respectively, contained in the tagged markup language source document;
    a storing unit storing the original text extracted from the tagged markup language source document in a first location in said storing unit and separately storing the at least first and second language tags in a second location of said storing unit; and
    an editing unit processing input of a user to edit the original text extracted from the tagged markup language source document to make a more favorable translated version using the original text, extracted from the tagged markup language source document which is displayed to the user.

2. A document processing apparatus according to claim 1, further comprising a translation processing unit making a translated version by translating the original text edited by said editing unit.

3. A document processing apparatus according to claim 2, further comprising a restoration unit restoring, from the original text after the editing and the translated version made by said translation processing unit, a new tagged markup language source document in a format of the tagged markup language source document, according to tags contained in the tagged markup language source document, including the language tag.

4. A computer implemented document processing apparatus, comprising:
    an analysis unit determining an original text and a translated version corresponding to the original text in a tagged markup language source document according to language tags, each designating a kind of human language and contained in the tagged markup language source document, and extracting the original text and the translated version from the tagged markup language source document resulting in the removal of the language tags;
    a storing unit storing in a first location the language tags and in a second location, without the language tags, both the original text end the translated version; and
    an editing unit editing the original text and the translated version to make a more favorable translated version by displaying the original text and the translated version, retrieved from the second location of said storing unit, in an original-versus-version form indicative of a correspondence between the original text and the translated version.

5. A document processing apparatus according to claim 4, further comprising a translation processing unit making a translated version by translating the original text edited by said editing unit.

6. A document processing apparatus according to claim 5, further comprising a restoration unit restoring, from the original text after the editing and the translated version made by said translation processing unit, a new tagged markup language document in a format of the tagged markup language source document, according to tags contained in the tagged markup language source document, said tags including the language tags.

7. A recording medium readable by a computer, said recording medium having a program recorded thereon for controlling the computer to execute a method comprising:
    determining and extracting an original text from a tagged markup language source document resulting in the removal of at least first and second language tags designating at least first and second human languages respectively;
    storing in a first location the at least first and second language tags and in a second location the original text without the language tags; and
    editing the original text retrieved from the second location to make a more favorable translated version of the original text.

8. A recording medium readable by a computer according to claim 7, wherein said program recorded on said recording medium controls the computer to execute the method further comprising:
    making a translated version by translating the original text after said editing of the original text; and
    restoring, from the original text after said editing and the translated version formed by said translating, a new tagged markup language source document in a format of the tagged markup language source document according to tags contained in the tagged markup language source document, including the language tag.

9. A recording medium readable by a computer, said recording medium having a program recorded thereon for controlling the computer to execute a method comprising:
    determining an original text end a translated version corresponding to the original text in a tagged markup language source document according to language tags each designating a kind of human language and contained in the tagged markup language source document and extracting the original text and the translated version from the tagged markup language source document resulting in the removal of the language tags;
    a storing unit storing in a first location the language tags and in a second location, without the language tags, both the original text and the translated version; and
    an editing unit processing input of a user to edit the original text and the translated version by displaying the original text and the translated version, retrieved from the second location of said storing unit, in an original-versus-version form indicative of a correspondence between the original text and the translated version.

10. A recording medium readable by a computer according to claim 9, wherein said program recorded on said recording medium controls the computer to execute the method further comprising:
- forming a translated version by translating the original text after editing of the original text; and
- restoring, from the original text after the processing and the translating, a new tagged document in a format of the tagged markup language source document, according to tags contained in the tagged markup language source document, the tags including the language tag.

11. A document processing method, comprising:
- determining and extracting an original text from a tagged markup language source document resulting in the removal of at least first and second language tags designating at least first and second human languages, respectively, contained in the tagged markup language source document;
- storing in a storing unit the original text extracted from the tagged markup language source document in a first location and separately storing the at least first and second language tags in a second location of said storing unit; and
- editing the original text input of a user extracted from the tagged markup language source document to make a more favorable translated version by using the original text, extracted from the tagged markup language source document, which is displayed to the user.

12. A document processing method according to claim 11, further comprising:
- making a translated version by translating the original text after editing of the original text; and
- restoring, from the original text after the editing and the translating, a new tagged markup language source document in a format of the tagged markup language source document according to tags contained in the tagged markup language source document, including the language tag.

13. A document processing method, comprising:
- determining an original text and a translated version corresponding to the original text in a tagged markup language source document according to language tags, each designating a kind of human language and contained in the tagged markup language source document and extracting the original text and the translated version from the tagged markup language source document resulting in the removal of the language tags;
- storing in a first location of a storing unit the language tags and in a second location of the storing unit without the language tags, both the original text and the translated version; and
- edit processing of the original text and the translated version to make a more favorable translated version by displaying the original text and the translated version, retrieved from the second location of said storing unit, in an original-versus-version form indicative of a correspondence between the original text and the translated version.

14. A document processing method according to claim 13, further comprising:
- forming a translated version by translating the original text after editing of the original text; and
- restoring, from the original text after the editing and the translating, a new tagged markup language source document in a format of the tagged markup language source document, according to tags contained in the tagged markup language source document, including the language tag.

\* \* \* \* \*

UNITED STATES PATENT AND TRADEMARK OFFICE
CERTIFICATE OF CORRECTION

PATENT NO.         : 7,168,040 B2
APPLICATION NO. : 10/902006
DATED              : January 23, 2007
INVENTOR(S)        : Yuki Yamamoto et al.

It is certified that error appears in the above-identified patent and that said Letters Patent is hereby corrected as shown below:

On Title Page, Item (56) (U.S. Patent Documents), change "Pulman et al." to --Putman et al.--.

Column 19, Line 67, after "text" change "end" to --and--.

Column 20, Line 50, after "text" change "end" to --and--.

Signed and Sealed this

First Day of May, 2007

JON W. DUDAS
*Director of the United States Patent and Trademark Office*